United States Patent Office 3,131,183
Patented Apr. 28, 1964

3,131,183
2-ACYLALKYLMERCAPTO-5:6-DIHYDRO-1:3:4-THIAZINE
Karl Hoffmann, Binningen, and Alfred Hunger, Basel, Switzerland, assignors to Ciba Corporation, a corporation of Delaware
No Drawing. Filed Oct. 10, 1961, Ser. No. 144,041
Claims priority, application Switzerland Oct. 28, 1960
9 Claims. (Cl. 260—243)

The present invention concerns 2-acylalkylmercapto-5:6-dihydro-1:3:4-thiazines and salts thereof.

The 5:6-dihydro-1:3:4-thiazine radical in the new compounds may contain further C-substituents, but it is preferably unsubstituted. Suitable substituents are, for example, aliphatic radicals, preferably lower alkyl groups such as methyl, ethyl, n-propyl, isopropyl, n-butyl or isobutyl, or aromatic radicals, preferably phenyl groups which themselves may be substituted by lower alkyl such as methyl, ethyl or propyl, or by free or etherified hydroxyl or mercapto groups, for example lower alkoxy or lower alkylmercapto such as methoxy, ethoxy, n-propoxy, isopropoxy, methylmercapto, ethylmercapto, alkylenedioxy such as methylenedioxy, esterified hydroxyl, for example, lower alkanoyloxy such as acetoxy or propionyloxy, lower alkoxy-carbonyloxy such as methoxy-carbonyloxy, acyl groups such as acetyl or propionyl, halogen such as fluorine, chlorine, bromine or iodine, a halogenalkyl such as a trifluoromethyl group, a nitro or amino group, preferably a tertiary amino group, for example di-lower alkylamino such as dimethylamino or diethylamino group.

In the acylalkylmercapto radical in position 2 of 5:6-dihydro-1:3:4-thiazine the alkylene radical may be linear or branched and is, for example, a methylene, 1:1- or 1:2-ethylene, 1:1-, 2:2-, 1:2-, 1:3- or 2:3-propylene, 1:2-, 1:3-, 1:4-, 2:3- or 2:4-butylene, 2:3- or 1:5-pentylene or 1:6-hexylene group.

The acyl radical belongs preferably to the aromatic series and is especially a benzoyl radical. The aroyl radicals may be substituted in the nucleus, for example by halogen atoms, nitro groups, lower alkyl, alkoxy or alkylmercapto groups; examples for such groups are given above.

The new compounds possess valuable pharmacological properties. Above all, they are distinguished by their analgesic, antipyretic and antiphlogistic effects and can thus be used as medicaments in human and veterinary medicine. They are also valuable intermediates for the manufacture of medicaments.

Of special value are compounds of the formula

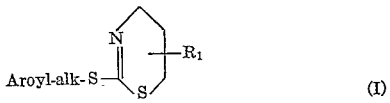

and their salts, in which $R_1$ represents a hydrogen atom or a lower alkyl group and "alk" represents a linear or branched alkylene radical containing at most 6 carbon atoms.

Special mention in this group deserve compounds of the formula

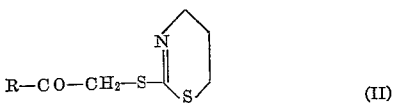

and their salts, in which R represents an unsubstituted phenyl ring or one that is substituted as mentioned above; particularly 2-benzoylmethylmercapto-5:6-dihydro-1:3:4-thiazine and its salts.

The new compounds are obtained when a 2-mercapto-5:6-dihydro-1:3:4-thiazine is condensed with an acylalkyl halide in the presence of a basic condensing agent and, if desired, converting resulting bases or salts into one another.

In the acylalkyl halide the halogen atom is preferably chlorine or bromine.

The basic condensing agent may be an alkali metal or alkaline earth metal, for example lithium, sodium, potassium or calcium preferably hydroxides thereof, such as sodium or potassium hydroxide or furthermore oxides or carbonates thereof, e.g. calcium oxide, sodium or potassium carbonate or bicarbonate. The reaction is carried out advantageously in the presence of a diluent or solvent, such as water or an organic solvent, for example an alkanol such as methanol, ethanol, propanol or isopropanol or tertiary butanol, an ether such as diethyl ether, dioxane or tetrahydrofuran, a ketone such as acetone, a formamide such as dimethylformamide, a hydrocarbon such as benzene, toluene or petroleum ether, or mixtures of said solvents.

The reaction is preferably performed at room temperature or, if necessary, at a lower or higher temperature, under atmospheric or superatmospheric pressure, or in the presence of an inert gas, for example nitrogen.

The starting materials are known or can be prepared by as such known methods. If desired, they may be used in the form of their salts.

Depending on the reaction conditions employed and starting materials used, the new compounds are obtained in the free form or in the form of their salts. From the salts the free bases can be prepared in known manner. From the latter salts can be prepared by reaction with acids. For the preparation of such acid addition salts there are preferably used therapeutically useful acids, for example inorganic acids such as hydrochloric, hydrobromic, perchloric, nitric, thiocyanic acid, sulfuric or phosphoric acids, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methanesulfonic, ethanesulfonic, hydroxyethanesulfonic, benzenesulfonic, para-toluenesulfonic, naphthalenesulfonic or sulfanilic acid; or methionine, tryptophan, lysine or arginine.

The new compounds are intended to be used as medicaments in the form of pharmaceutical preparations containing them in conjunction with a pharmaceutical organic or inorganic, solid or liquid excipient suitable for local, enteral (for example oral) or parenteral administration. Suitable excipients are substances that do react with the new compounds such, for example, as water, gelatine, lactose, starch, magnesium stearate, talc, vegetable oils, benzyl alcohols, gums, polyalkylene glycols, cholesterol or other known medicinal excipients. The pharmaceutical preparations may be, for example, tablets, dragees or capsules, or in liquid form solutions, suspensions or emulsions. They may be sterilized and/or may contain assistants such as preservatives, stabilizers, wetting agents or emulsifiers, salts for regulating the osmotic pressure, or buffers. They may also contain further therapeutically valuable substances. The new compounds may also be used in veterinary medicine.

The following examples illustrate the invention:

*Example 1*

A suspension of 13.3 grams of 2-mercapto-5:6-dihydro-1:3:4-thiazine in 100 cc. of water is treated at 20–30° C. dropwise, simultaneously, with 30 grams of benzoyl methyl bromide in 100 cc. of dioxane and 15 cc. of 10 N-sodium hydroxide solution. The mixture is then stirred for 14 hours at 20 to 30° C., extracted with ether, the ethereal extract is washed with water, dried over magnesium sulfate and evaporated, and the remaining crude 2-benzoylmethylmercapto-5:6-dihydro-1:3:4-thiazine is converted into the hydrochloride (melting at 175–176° C.) by being dissolved in alcohol and adding one equivalent of hydrogen chloride in alcohol.

*Example 2*

A suspension of 13.3 grams of 2-mercapto-5:6-dihydro-1:3:4-thiazine in 100 cc. of water is treated at 20–30° C. dropwise and with stirring, simultaneously, with 34 grams of para-methylbenzoyl-methyl bromide in 100 cc. of dioxane and 15 cc. of 10 N-sodium hydroxide solution; the mixture is then stirred for 14 hours at 20–30° C. The reaction mixture is extracted with diethyl ether, the ethereal extract washed with water, dried over magnesium sulfate and evaporated. The resulting 2-(para-methylbenzoylmethylmercapto)-5:6-dihydro-1:3:4-thiazine melts at 80–82° C. after being crystallized from a mixture of acetone and diethyl ether; its hydrochloride, prepared as described in Example 1, melts at 180–181° C.

*Example 3*

A suspension of 5.3 grams of 2-mercapto-5:6-dihydro-1:3:4-thiazine in 100 cc. of water is treated at 20–30° C. dropwise and with stirring, simultaneously, with 11.7 grams of para-chlorobenzoyl methyl chloride in 50 cc. of dioxane and 6.2 cc. of 10 N-sodium hydroxide solution. The mixture is stirred for 14 hours at 20–30° C. The reaction mixture is extracted with diethyl ether, the ethereal extract washed with water, dried over magnesium sulfate and evaporated. The resulting 2-(para-chlorobenzoylmethylmercapto)-5:6-dihydro-1:3:4-thiazine crystallizes from a mixture of acetone and diethyl ether and then melts at 90–91° C.; its hydrochloride melts at 190–192° C.

*Example 4*

A mixture of 13.3 grams of 2-mercapto-5:6-dihydro-1:3:4-thiazine and 100 cc. of water is treated at 20–30° C. dropwise and with stirring, simultaneously, with 34 grams of 1-benzoylethyl bromide and 15 cc. of 10 N-sodium hydroxide solution. Stirring is continued for 14 hours at 20–30° C., the reaction mixture then extracted with ether and the ethereal extract washed with water, dried over magnesium sulfate and evaporated. The remaining crude 2-(α-benzoyl-ethylmercapto)-5:6-dihydro-1:3:4-thiazine is converted into its hydrochloride melting at 194–195° C. by being dissolved in ethanol and adding the calculated quantity of ethanolic hydrochloric acid.

*Example 5*

The products of the present invention may be used in the form of pharmaceutical preparations. Capsules containing 200 mg. of 2-benzoyl-methylmercapto-5:6-dihydro-1:3:4-thiazine hydrochloride may be obtained, for example, as follows:

Ingredients for 1000 capsules:  G.
2 - benzoylmethylmercapto - 5:6 - dihydro-1:3:4-thiazine hydrochloride _____ 200.00
Talc _____ 20.00
Magnesium stearate _____ 5.00

The triturated and screened ingredients are mixed thoroughly and the mixture put into gelatine capsules in portions of 225 mg.

What is claimed is:

1. A member selected from the group consisting of a compound of the formula:

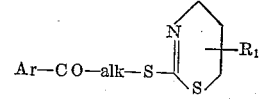

in which $R_1$ is a member selected from the group consisting of hydrogen, lower alkyl, phenyl, lower alkyl-phenyl, hydroxy-phenyl, lower alkoxy-phenyl, mercapto-phenyl, lower alkyl-mercapto-phenyl, lower alkylenedioxy-phenyl, lower alkanoyloxy-phenyl, lower alkoxy-carbonyloxy-phenyl, lower alkanoyl-phenyl, halogeno-phenyl, halogeno-lower alkyl-phenyl, nitro-phenyl and di-lower alkyl-amino-phenyl, Ar is a member selected from the group consisting of phenyl, halogeno-phenyl, nitro-phenyl, lower alkyl-phenyl, lower alkoxy-phenyl and lower alkyl-mercapto-phenyl, and alk is a member selected from the group of straight alkylene and branched alkylene having at most six carbon atoms, and a pharmaceutically acceptable acid addition salt thereof.

2. 2 - benzoylmethylmercapto - 5:6 - dihydro - 1:3:4-thiazine.

3. 2 - (p - methylbenzoyl - methylmercapto) - 5:6 - dihydro-1:3:4-thiazine.

4. 2 - (p - chlorobenzoyl - methylmercapto) - 5:6 - dihydro-1:3:4-thiazine.

5. 2 - (α - benzoyl - ethylmercapto) - 5:6 - dihydro-1:3:4-thiazine.

6. The pharmaceutically acceptable acid addition salts of 2-benzoylmethylmercapto-5,6-dihydro-1,3,4-thiazine.

7. The pharmaceutically acceptable acid addition salts of 2-(p-methylbenzoyl-methylmercapto)-5,6-dihydro-1,3,4-thiazine.

8. The pharmaceutically acceptable acid addition salts of 2-(p-chlorobenzoyl-methylmercapto)-5,6-dihydro-1,3,4-thiazine.

9. The pharmaceutically acceptable acid addition salts of 2 - (α - benzoyl - ethylmercapto)-5,6-dihydro-1,3,4-thiazine.

No references cited.

UNITED STATES PATENT OFFICE
CERTIFICATE OF CORRECTION

Patent No. 3,131,183                    April 28, 1964

Karl Hoffmann et al.

It is hereby certified that error appears in the above numbered patent requiring correction and that the said Letters Patent should read as corrected below.

Column 2, line 53, after "do" insert -- not --.

Signed and sealed this 8th day of September 1964.

(SEAL)
Attest:

ERNEST W. SWIDER
Attesting Officer

EDWARD J. BRENNER
Commissioner of Patents